Figure 1:
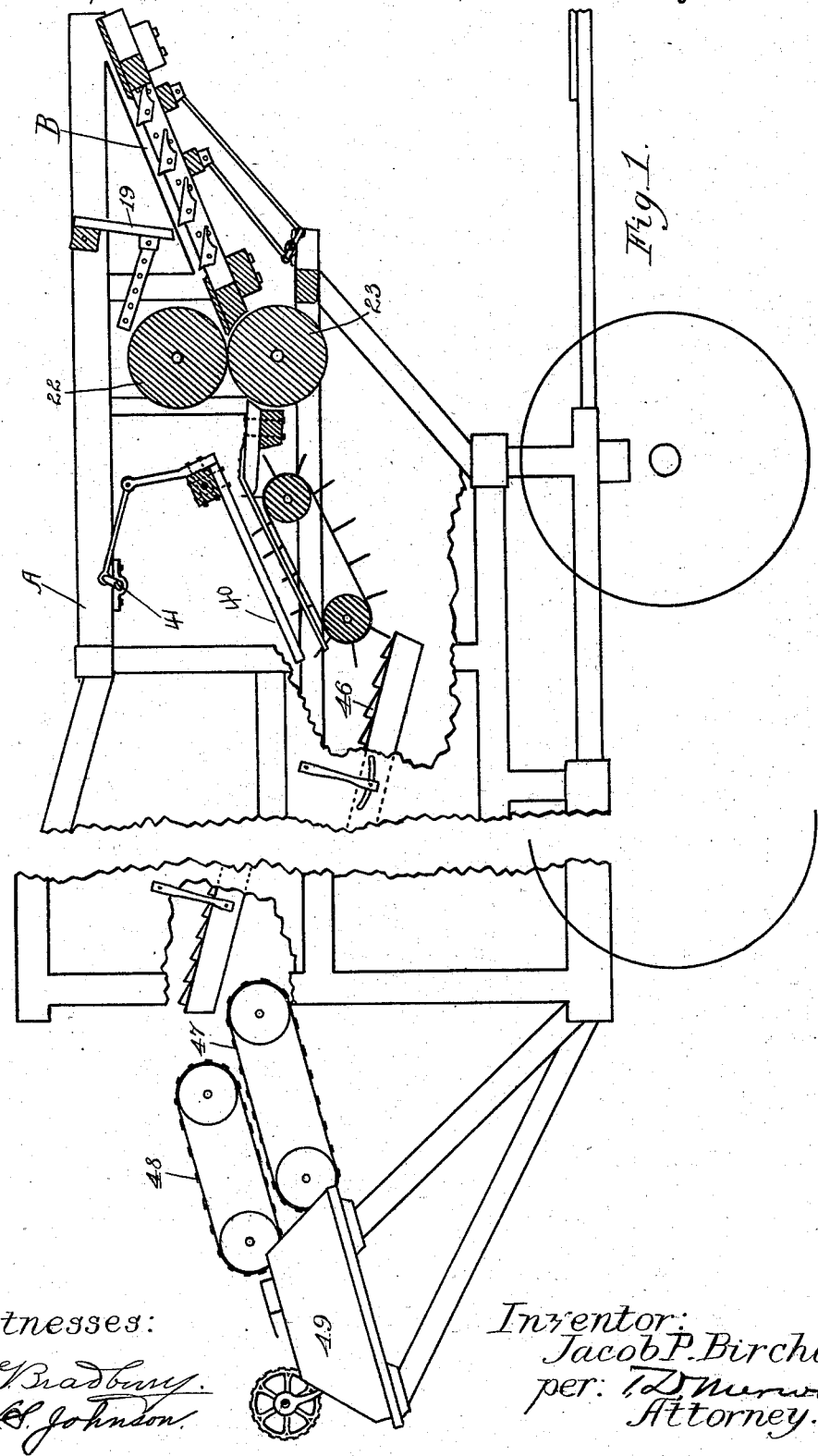

(No Model.) 2 Sheets—Sheet 2.
J. P. BIRCHALL.
FLAX THRASHER.
No. 559,354. Patented May 5, 1896.
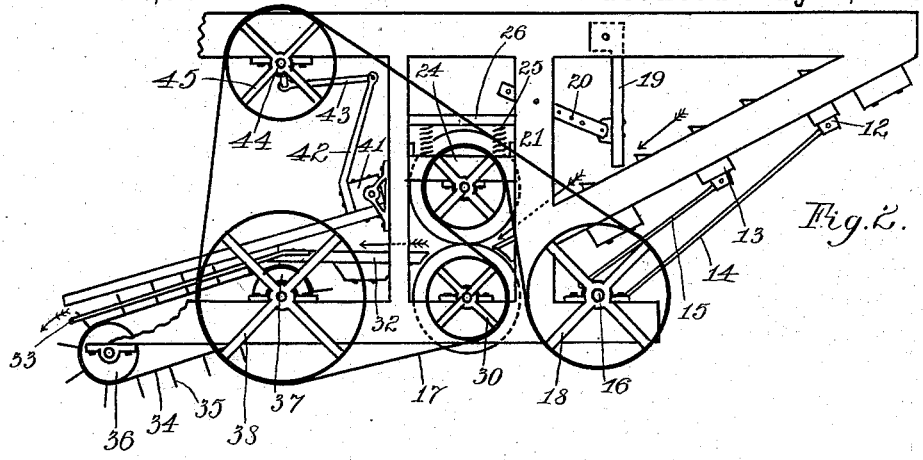
Fig. 2.
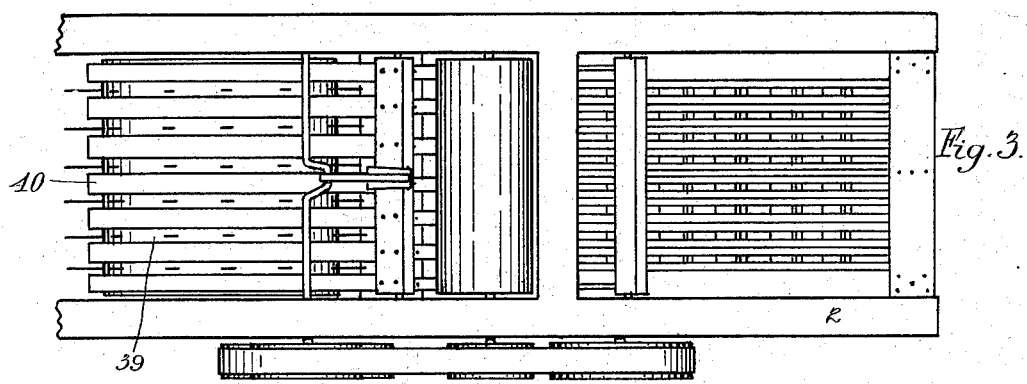
Fig. 3.
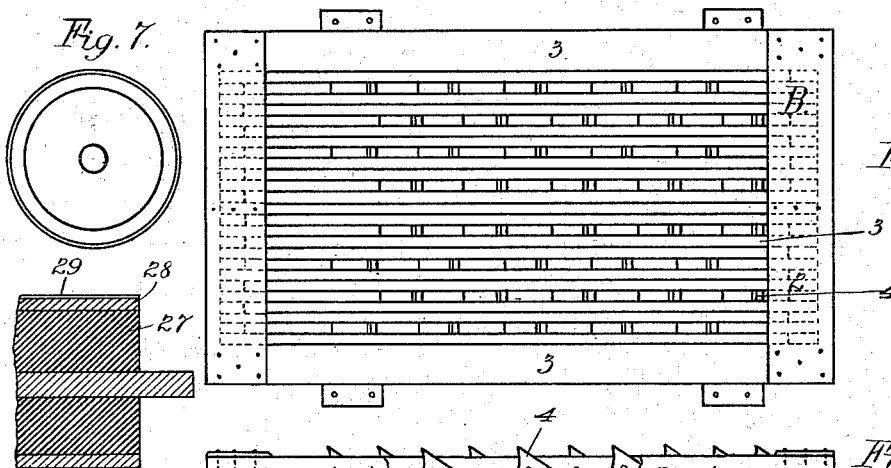
Fig. 7.
Fig. 4.
Fig. 8.
Fig. 5.
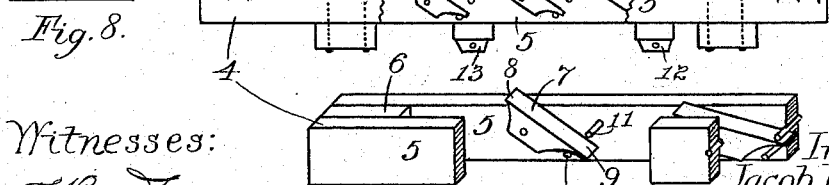
Fig. 6.
Witnesses:
F. Bradbury.
A. S. Johnson.
Inventor:
Jacob P. Birchall.
per: Attorney.

UNITED STATES PATENT OFFICE.

JACOB P. BIRCHALL, OF FARGO, NORTH DAKOTA.

FLAX-THRASHER.

SPECIFICATION forming part of Letters Patent No. 559,354, dated May 5, 1896.

Application filed October 16, 1894. Serial No. 526,893. (No model.)

*To all whom it may concern:*

Be it known that I, JACOB P. BIRCHALL, of Fargo, Cass county, North Dakota, have invented certain Improvements in Flax-Thrashers, of which the following is a specification.

My invention relates to improvements in thrashing-machines, its object being to provide an improved form of machine adapted especially for the thrashing of flax in such manner as to remove the seed therefrom without seriously injuring or breaking the fiber.

To this end my invention consists in the combination of an inclined feed-board having gangs of dogs projecting through slots in the same, adapted to tear loose and carry with them small quantities of the flax from the bundle lying in a mass upon the board; a pair of crushing-rolls, preferably having an elastic covering, positioned to receive the flax from the feed-board; an endless belt with teeth or projections for carrying the flax from the rolls over a thrashing table or floor, and a gang of flails arranged to strike the flax as it passes over this floor, so as to beat out the seeds remaining in the bolls. I also prefer to arrange in connection with the thrashing-table a series of suitable separating-shoes and cleaning-sieves and a self-binding attachment to receive and bind into bundles the straw as it comes from the sieves.

My invention further consists in the construction and combination hereinafter more particularly described and claimed.

In the accompanying drawings, forming part of this specification, Figure 1 is a side elevation of a separator fitted with my improved attachments, consisting of feed-board, crushing-rolls, thrasher, and binder, the side walls of the machine being partially broken away to show the interior mechanism. Fig. 2 is a partial side elevation of the same, showing the means for driving the various operating parts. Fig. 3 is a plan view of the same. Fig. 4 is an enlarged plan view of the feed-board. Fig. 5 is a side elevation of the same, a part of the frame being broken away to show the pivoted dogs. Fig. 6 is an enlarged detail of part of the same. Fig. 7 is an end view of one of the crushing-rolls, and Fig. 8 is a detail central longitudinal section of the same.

In the drawings, A represents conventionally an ordinary separator, from which the thrashing-cylinder has been removed and my improved attachments substituted. These consist of an inclined feed-board B, which is made up of a frame 2, between the bars 3 of which are arranged reciprocating gangs of compound bars 4, made up of similar strips or pieces 5, with intermediate blocks 6, leaving slots in which are pivoted series of dogs 7. One end, 8, of each dog projects above the top of the bars, the other end, 9, being held between pins 10 and 11, permitting slight oscillation. These gangs of compound bars and dogs are secured upon cross-bars 12 and 13 alternately, and these cross-bars are connected by pitmen 14 and 15 with a double crank-shaft 16, driven by means of a belt 17 and running over the wheel 18, keyed upon the shaft 16, whereby the two gangs of dogs are reciprocated alternately. Near the bottom of the feed-board is hung the adjustable brace 19, the space between which and the feed-board being adjusted for the work to be done by means of the link 20, adjustably secured to the standards 21.

At the bottom of the feed-board is arranged the pair of crushing-rolls 22 and 23, so positioned as to receive the flax as it is carried by the dogs underneath the stop 19. The upper roll 22 is mounted in suitable bearings upon cross-bars 24, which have a vertical sliding movement controlled by cushion-springs 25, interposed between them and the fixed bars 26, the springs thus determining the amount of pressure of the roll upon the one underneath. While these rolls may be of any desired construction, I prefer that shown in detail, Figs. 7 and 8, in which the cylinder 27 is covered with an elastic envelop or tire 28, made preferably of soft rubber, this being inclosed and protected by the cover 29, of canvas or other material, to protect it from injury and undue wear. The rolls 22 and 23 are driven by means of the common belt 17, running over their pulleys 30 and 31, as shown best in Fig. 2. Arranged on the opposite side of the crushing-rolls is the platform 32, upon which the flax is delivered after passing through the crushing-rolls. Thence it is carried over the downwardly-inclined thrashing-floor 33 by means of the endless feed-belt 34, having projections or prongs 35 and carried upon suitable rolls 36 and 37, driven by the belt 17 through the medium of the wheel 38. The prongs 35 of the belt project through slots 39 in the thrashing-floor and engage the flax. (See Fig. 3.)

Above the thrashing-floor is arranged a gang of flails 40, secured at one end to the rock-shaft 41, and so positioned as to stand above the slats of the floor. The flails are operated by means of the arm 42, fixed to the rock-shaft 41, and connected by means of the pitman 43 to the crank-shaft 44, driven by means of the common belt 17 running over the wheel 45.

From the thrashing device the straw is delivered onto the shoes 46 and other cleaning devices. (Not shown.) From the rear of the separator the straw is delivered onto the endless belt 47 and carried between it and the endless belt 48 to the binder attachment 49, of any suitable construction, the features of which are not necessarily shown.

In operation the flax bundle, the band of which has been severed, is laid transversely upon the feed-table and against the stop 19, which is adjusted with its lower edge in such position above the feed-table as to permit the proper quantity of flax to be carried underneath. The gangs of dogs alternately reciprocated in the manner described in their upward movement are depressed as they pass under the flax, but in their downward movement engage and tear away small quantities of the flax and carry it underneath the stop. Thence the flax is delivered sidewise to the crushing-rolls in a continuous stream, in passing between which the bolls are crushed and a portion of the seeds freed. Thence the straw passes over the intermediate table and onto the thrashing-floor, where the remainder of the seeds are beaten out, thence passing through the separator and the binding attachment, by which it is rebound into bundles, so that it may be treated for the removing of the fiber.

As the result of this improved mechanism and process the stalks, being carried transversely of the feeding, crushing, and thrashing mechanism, are practically unbroken, and are kept with their tips and butts in alinement, so as to be as readily bundled as when delivered from the harvester cycle-bars. The bundles of thrashed straw can then be readily treated for removing the woody matter and cleaning the fiber with the least possible waste.

I claim—

In a flax-thrasher, the combination with the feed-board, of the bundle-stop adjustably arranged above the same, the series of dogs for subdividing the bundle lying against said stop and carrying the stalks in a thin layer transversely of the path of their movement, the crushing-rolls, the longitudinally-slotted thrashing-floor, the endless toothed carriers arranged under said thrashing-floor with their teeth projecting through the slats thereof, the series of pivoted flails arranged above the slats of said floor and adapted to thrash the stalks while passing over the same, and the self-binding attachment.

In testimony whereof I affix my signature in presence of two witnesses.

JACOB P. BIRCHALL.

Witnesses:
R. A. SHATTUCK,
Y. IRVIN.